(12) United States Patent
Lueng et al.

(10) Patent No.: US 8,582,248 B2
(45) Date of Patent: Nov. 12, 2013

(54) MAGNETORESISTIVE SENSOR, INCLUDING NON-MAGNETIC CONDUCTING LAYER EMBEDDED IN SHIELDING LAYER AND MAGNETIC HEAD, HEAD GIMBAL ASSEMBLY AND DISK DRIVE UNIT WITH THE SAME

(75) Inventors: Chiuming Lueng, Hong Kong (CN); Kazuki Sato, Hong Kong (CN); Yohei Koyanagi, Hong Kong (CN); Cheukwing Leung, Hong Kong (CN); Juren Ding, DongGuan (CN); Rongkwang Ni, DongGuan (CN); Wanyin Kwan, Hong Kong (CN); Siuman Mok, Hong Kong (CN)

(73) Assignees: SAE Magnetics (H.K.) Ltd., Hong Kong (CN); TDK Corporation, Tokyo (JP)

( * ) Notice: Subject to any disclaimer, the term of this patent is extended or adjusted under 35 U.S.C. 154(b) by 378 days.

(21) Appl. No.: 12/929,198

(22) Filed: Jan. 6, 2011

(65) Prior Publication Data
US 2012/0099227 A1     Apr. 26, 2012

(30) Foreign Application Priority Data
Oct. 26, 2010   (CN) .......................... 2010 1 0539422

(51) Int. Cl.
*G11B 5/39*        (2006.01)
(52) U.S. Cl.
USPC .................................... 360/319; 360/324.12

(58) Field of Classification Search
USPC ................ 360/319, 322, 317, 324.1, 324.11, 360/324.12, 324.2
See application file for complete search history.

(56) References Cited

U.S. PATENT DOCUMENTS

| | | | |
|---|---|---|---|
| 6,656,538 B2 | 12/2003 | Sato et al. | |
| 7,035,062 B1 * | 4/2006 | Mao et al. | 360/324.2 |
| 2006/0158789 A1 * | 7/2006 | Koyama et al. | 360/321 |
| 2012/0075751 A1 * | 3/2012 | Gill et al. | 360/319 |
| 2012/0134057 A1 * | 5/2012 | Song et al. | 360/319 |
| 2012/0268846 A1 * | 10/2012 | Gadbois et al. | 360/319 |

* cited by examiner

*Primary Examiner* — Jefferson Evans
(74) *Attorney, Agent, or Firm* — Nixon & Vanderhye PC (57) ABSTRACT

A MR sensor comprises a first shielding layer, a second shielding layer, a MR element and a pair of hard magnet layers sandwiched therebetween, and a non-magnetic insulating layer formed at a side of the MR element far from an air bearing surface of a slider. The MR sensor further comprises a first non-magnetic conducting layer formed between the first shielding layer and the MR element, and the first non-magnetic conducting layer is embedded in the first shielding layer and kept separate from the ABS. The MR sensor of the invention can obtain a narrower read gap to increase the resolution power and improve the reading performance, and obtain a strong longitudinal bias field to stabilize the MR sensor so as to increase the total sensor area and, in turn, get an improved reliability and performance. The present invention also discloses a magnetic head, a HGA and a disk drive unit.

19 Claims, 9 Drawing Sheets

MAGNETORESISTIVE SENSOR, INCLUDING NON-MAGNETIC CONDUCTING LAYER EMBEDDED IN SHIELDING LAYER AND MAGNETIC HEAD, HEAD GIMBAL ASSEMBLY AND DISK DRIVE UNIT WITH THE SAME

This application claims the benefit of Chinese Patent Application No. 201010539422.8, filed 26 Oct. 2010, the entire contents of which is hereby incorporated by reference in this application.

FIELD OF THE INVENTION

The present invention relates to information recording disk drive devices and, more particularly to a magnetoresistive (MR) sensor, a magnetic head, a head gimbal assembly (HGA) and disk drive unit with the same.

BACKGROUND OF THE INVENTION

Hard disk drive incorporating rotating magnetic disks is commonly used for storing data in the magnetic media formed on the disk surfaces, and a movable slider including read sensors are generally used to read data from tracks on the disk surfaces.

Presently, MR sensor is used as a kind of popular read sensor because of its better capability to read data from disk surface at a greater track and linear densities than traditional film inductive slider.

Now, several types of MR sensors have been widely used by disk drive manufacturers in succession. One is anisotropic magnetoresistive (AMR) sensor, which makes the angle between the magnetization direction and the direction of sense current flowing through the MR element change and, in turn, cause a change the resistance of the MR element and a corresponding change in the sensed current or voltage. Another type is giant magnetoresistive (GMR) sensor manifesting the GMR effect. The GMR effect is a phenomenon that the magnetoresistive ratio (MR ratio) will change under an external magnetic field. The GMR sensor comprises two ferromagnetic layers and a non-ferromagnetic layer sandwiched between the two ferromagnetic layers. The resistance of the non-ferromagnetic layers varies with the magnetic moments of the ferromagnetic layers, the conduction electrons and the spin-dependent scattering. Still another type of MR sensor is tunnel magnetoresistive (TMR) sensor, which has become the mainstream MR sensor due to its more remarkable change of MR ratio by replacing AMR sensor and GMR sensor.

Figure 1A:
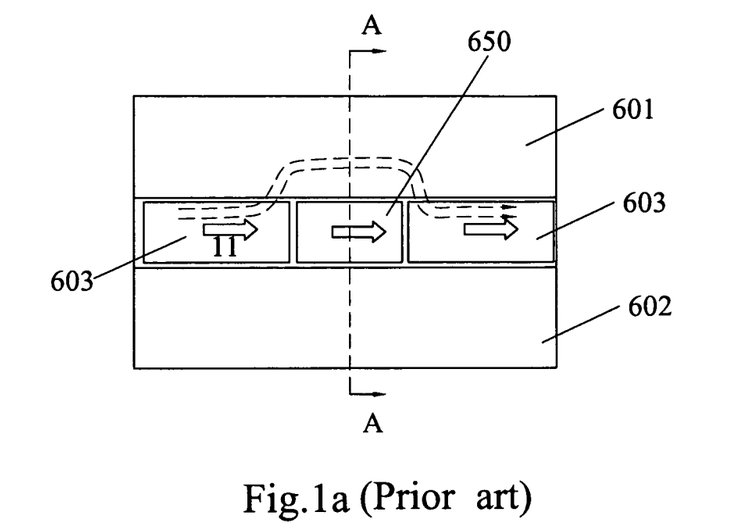
FIG. 1a is a view of a conventional TMR sensor seen from the ABS.
Figure 1B:
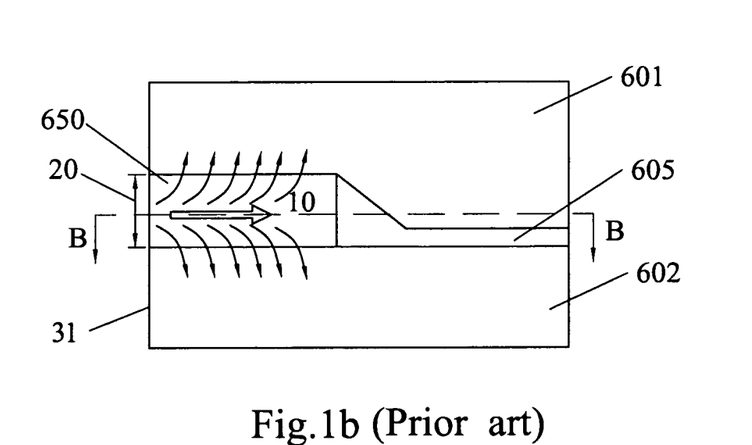
FIG. 1b is a cross-section view of the TMR sensor along line A-A indicated in FIG. 1a that shows the signal field shunting status.
Figure 1C:
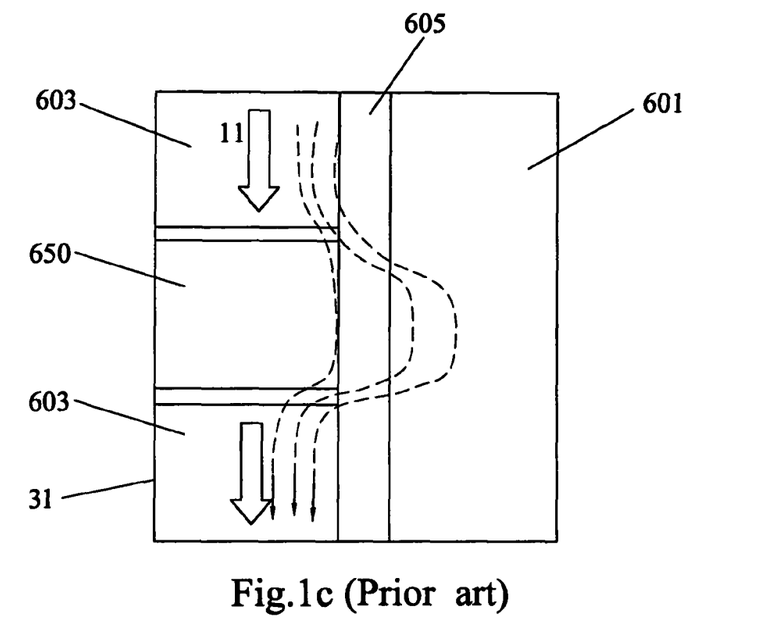
FIG. 1c is a top view along line B-B indicated in FIG. 1b that shows the longitudinal bias field leaking status.

FIG. 1a is a schematic view of a conventional TMR sensor 600 seen from air bearing surface (ABS) 31 of a slider. As shown in FIG. 1a, the TMR sensor 600 includes a first shielding layer 601, a second shielding layer 602, a MR element 650 formed therebetween, and a pair of hard magnet layers 603 respectively placed on two sides of the MR element 650. As shown in FIG. 1b, the TMR sensor 600 further includes a non-magnetic insulating layer 605 sandwiched between the two shielding layers 601, 602, adjacent to the MR element 650 and far from the ABS 31. The non-magnetic insulating layer 605 electrically insulates the first shielding layer 601 from the second shielding layer 602.

Referring to FIGS. 1a and 1b, an outer signal field coming from a magnetic medium, such as a disk of a disk drive unit will be supplied to the MR element 650, which has a magnetic direction 10 perpendicular to the ABS 31. The hard magnet layers 603 provides a longitudinal bias field to the MR element 650 for stabilizing a free layer of the MR element 650, which has a magnetic direction 11 parallel to the ABS 31. As known, the free layer having the shape anisotropy effect will rotate as a result of the outer field, thus the magnetization direction of the free layer will shift freely. While the longitudinal bias field with a fixed direction can stabilize the free layer to a degree. The stronger longitudinal bias field utilized, the more stable sensor can be obtained.

However, since the shielding layers 601, 602 are magnetic, and there is no distance or material separated the MR element 650 from the shielding layers 601, 602, as shown in FIG. 1b, thus the signal field will freely shunt to the shielding layers 601 and 602 when the disk drive unit is in operation. It' known, as a result of the shunting signal field, the efficiency of the TMR sensor 600 will be decreased.

Moreover, for the similar reason, as shown in FIG. 1a, a part of the longitudinal bias field supplied from the hard magnet layers 603 will leak to the shielding layers 601, 602, which will weaken the longitudinal bias. As a result of the weakened longitudinal bias, the magnetization direction of the free layer will fluctuate up and down for its shape anisotropy effect, which will bring the noise and, in turn, affect the performance of the MR sensor. Under this case, it is general to reduce megnetoresistive height (MRH) to stabilize the magnetization direction of the free layer. However, on the other hand, the total sensor area will be also reduced as the MRH is decreased, which will weaken the performance of the MR sensor.

Figure 2:
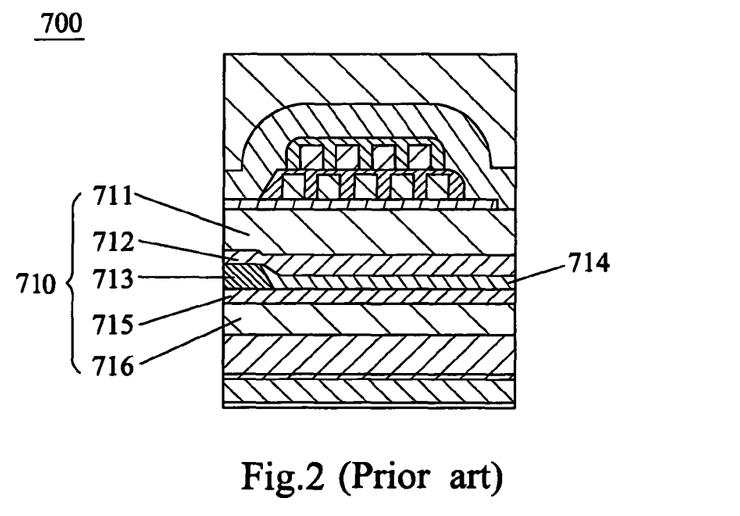
FIG. 2 is a schematic view of another conventional MR sensor.

For solving the above-mentioned problems, an improved MR sensor is disclosed in U.S. Pat. No. 6,656,538. As illustrated in FIG. 2, a MR sensor 710 of a magnetic head 700 includes a first shielding layer 711, a first non-magnetic conducting layer 712, a MR element 713, an insulating layer 714, a second non-magnetic conducting layer 715 and a second shielding layer 716 laminated in this order. Due to the first and the second non-magnetic conducting layers 712, 715, thus the distance between the MR element 713 and the two shielding layers 711, 716 is adjusted, that is increased. Therefore, it can prevent the signal field from shunting to the first and second shielding layers 711, 716, and prevent the longitudinal bias field from leaking to first and second shielding layers 711, 716, making the less longitudinal bias field to be weakened. As a result, the more and stronger longitudinal bias field can be received by the MR sensor, which can decrease the strength of the shape anisotropy effect of the free layer. Therefore, the magnetization direction of the free layer is stable and, in turn, the performance of the MR sensor is improved.

However, as the areal density of the disk surface grows and increases, resolution power is one of the important requirements of the MR sensor reading performance and required to become higher and stronger. As we known, the resolution power is dependent on a "read gap" which is defined by the spacing between the first and the second shielding layers, such as the arrow 20 indicated in FIG. 1b and the arrow 40 shown in FIG. 2. It' known that the distance of the read gap will affect the bit recognizability on the disk surface directly, more specifically, the wider read gap will not recognize and detect the narrower linear density of magnetic bit. In other words, the reading resolution power of the MR sensor is decreased, which will further affect signal to noise ratio (SNR), even the performance of reading data from disk. Although the improved MR sensor 710 shown in FIG. 2 can prevent the signal field and the longitudinal field shunting to improve the performance of the MR sensor 710, due to the added two non-magnetic conducting layers 712, 715 to make the read gap become wider, thus the problem of low resolution power and the successional problems still exist yet.

Hence, it is desired to provide an improved MR sensor to overcome the above-mentioned drawbacks and achieve the best of both worlds.

SUMMARY OF THE INVENTION

One objective of the present invention is to provide a MR sensor which can obtain a narrower read gap to increase the resolution power and improve the reading performance, and obtain a strong longitudinal bias field to stabilize the MR sensor so as to increase the total sensor area and, in turn, get an improved reliability and performance.

Another objective of the present invention is to provide a magnetic head having a MR sensor which can obtain a narrower read gap to increase the resolution power and improve the reading performance, and obtain a strong longitudinal bias field to stabilize the MR sensor so as to increase the total sensor area and, in turn, get an improved reliability and performance.

Yet another objective of the present invention is to provide a head gimbal assembly having a MR sensor which can obtain a narrower read gap to increase the resolution power and improve the reading performance, and obtain a strong longitudinal bias field to stabilize the MR sensor so as to increase the total sensor area and, in turn, get an improved reliability and performance.

Still a further objective of the present invention is to provide a disk drive unit having a MR sensor which can obtain a narrower read gap to increase the resolution power and improve the reading performance, and obtain a strong longitudinal bias field to stabilize the MR sensor so as to increase the total sensor area and, in turn, get an improved reliability and performance.

To achieve the above objectives, a MR sensor comprises a first shielding layer, a second shielding layer, a MR element and a pair of hard magnet layers sandwiched therebetween, and a non-magnetic insulating layer formed at a side of the MR element far from an air bearing surface of a slider. The pair of hard magnet layers respectively placed on two sides of the MR element. Therein, the MR sensor further comprises a first non-magnetic conducting layer formed between the first shielding layer and the MR element, and the first non-magnetic conducting layer is embedded in the first shielding layer and kept separate from the air bearing surface.

Preferably, the MR sensor further comprises a second non-magnetic conducting layer formed between the second shielding layer and the MR element, and the second non-magnetic conducting layer is buried in the second shielding layer and kept separate from the air bearing surface.

Preferably, at least the first or the second non-magnetic conducting layer is trapezoidal.

Preferably, the non-magnetic insulating layer has a same width with that of the MR element at least.

Preferably, the MR element comprises an antiferromagnetic layer formed on the second shielding layer, a pinned layer formed on the antiferromagnetic layer, a free layer formed therebetween, and an insulating tunnel barrier layer formed between the pinned layer and the free layer.

A magnetic head of the present invention comprises a MR sensor and a write head formed on the MR sensor. The MR sensor comprises a first shielding layer, a second shielding layer, a MR element and a pair of hard magnet layers sandwiched therebetween, and a non-magnetic insulating layer formed at a side of the MR element far from an air bearing surface of a slider. The pair of hard magnet layers respectively placed on two sides of the MR element. Therein, the MR sensor further comprises a first non-magnetic conducting layer formed between the first shielding layer and the MR element, and the first non-magnetic conducting layer is embedded in the first shielding layer and kept separate from the air bearing surface.

A HGA of the present invention comprises a slider with a MR sensor and a suspension to support the slider. The MR sensor comprises a first shielding layer, a second shielding layer, a MR element and a pair of hard magnet layers sandwiched therebetween, and a non-magnetic insulating layer formed at a side of the MR element far from an air bearing surface of a slider. The pair of hard magnet layers respectively placed on two sides of the MR element. Therein, the MR sensor further comprises a first non-magnetic conducting layer formed between the first shielding layer and the MR element, and the first non-magnetic conducting layer is embedded in the first shielding layer and kept separate from the air bearing surface.

A disk drive unit of the invention comprises a HGA with a slider, a drive arm to connect with the HGA, a rotatable disk and a spindle motor to spin the disk, and a slider with a MR sensor for reading data from the disk. The MR sensor comprises a first shielding layer, a second shielding layer, a MR element and a pair of hard magnet layers sandwiched therebetween, and a non-magnetic insulating layer formed at a side of the MR element far from an air bearing surface of a slider. The pair of hard magnet layers respectively placed on two sides of the MR element. Therein, the MR sensor further comprises a first non-magnetic conducting layer formed between the first shielding layer and the MR element, and the first non-magnetic conducting layer is embedded in the first shielding layer and kept separate from the air bearing surface.

In comparison with the prior art of the MR sensor, a first non-magnetic conducting layer is formed between the first shielding layer and the MR element, and the first non-magnetic conducting layer is embedded in the first shielding layer and kept separate from the air bearing surface. Basing on it, the read gap between the first and the second shielding layers is narrower, so that it can recognize and detect the narrower linear density of magnetic bit, that is, the resolution power of the MR sensor is increased and, in turn, the SNR become better and the performance of reading data from disk is improved.

On the other hand, the first non-magnetic conducting layer formed between the first shielding layer and the MR element can prevent the signal field and the longitudinal bias field from shunting or leaking to the first shielding layer, which can improve the efficiency of the MR sensor and make the less longitudinal bias field to be weakened. As a result, the more and stronger longitudinal field can be received by the MR sensor, which can decrease the strength of the shape anisotropy effect. Thus the magnetization direction of the free layer of the MR sensor won't fluctuate freely to obtain a stable performance. Under this case, a MRH can be increased to a suitable and desired value and, in turn, increase the total sensor area which is helpful to improve the performance of the slider. For example, a bigger resistance area can be used to attain an improved the MR ratio, and thus an improved electro-static discharge (ESD) performance can be acquired.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a MR sensor of a magnetic head. The MR sensor comprises a first non-magnetic conducting layer is formed between the first shielding layer and the MR element, and the first non-magnetic conducting layer is embedded in the first shielding layer and kept separate from the ABS. By such a design of the MR sensor, on one hand, as the read gap between the first and the second shielding layers is narrower than the prior art, so the resolution power of the MR sensor is increased and, in turn, the performance of reading data from disk is improved. On the other hand, a single field and a longitudinal bias field can be prevented from shunting or leaking to the second shielding layer, so that the efficiency of the MR sensor is improved and the less longitudinal bias field is weakened.

Several example embodiments of a MR sensor for a magnetic head of a HGA of a disk drive unit will now be described. It is noted that the MR sensor may be implemented in any suitable HGA and/or disk drive device having such a MR sensor having the above-mentioned advantages. That is, the invention may be used in any suitable device having a MR sensor in any industry.

The conventional magnetic head for a slider typically includes a read portion for reading data from the disk, and a write portion for writing data into the disk. The read portion is generally formed by a MR sensor, such as Current Perpendicular to Plane (CPP) sensor, Current In Plane (CIP) sensor, TMR sensor, GMR sensor, or AMR sensor. For being understood well, the present description only concentrates on the embodiment of the CPP-TMR sensor. Obviously, the persons ordinarily skilled in the art can understand the application of the present invention on the other sensors after reading the following description. Now, a detailed description of the slider with the MR sensor according to some preferred embodiments of the present invention will be illustrated as following.

Figure 3:
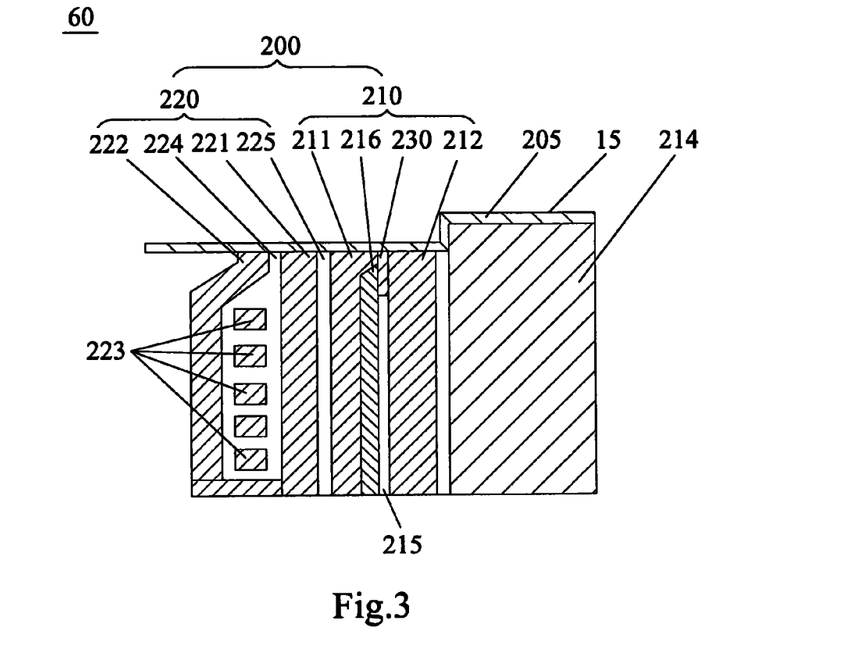
FIG. 3 is a cross-section view of a slider according to an embodiment of the present invention.

FIG. 3 is a cross-section view of the slider 60 according to an embodiment of the present invention. The slider 60 is lapped to form an ABS 15 being spaced from a surface of a rotating disk by air bearing. The slider 60 includes a substrate 214 and a magnetic head 200 formed on the substrate 214 for reading or writing data. Concretely, the magnetic head 200 includes a MR sensor 210 formed on the substrate 214 and a write head 220 formed on the MR sensor 210.

Figure 5:
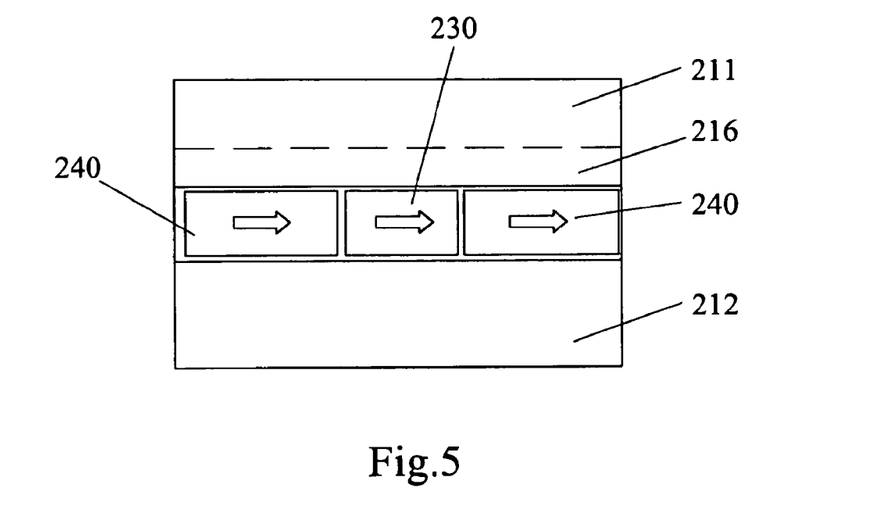
FIG. 5 is a schematic view of a MR sensor of the magnetic head shown in FIG. 3 seen from the ABS.

More specifically, referring to FIGS. 3 and 5, the MR sensor 210 includes a first shielding layer 211 formed on the substrate 214, a second shielding layer 212, and a MR element 230 sandwiched between the first and second shielding layers 211, 212. Therein, a pair of hard magnet layers 240 (referring to FIG. 5) is sandwiched therebetween as well and respectively placed on two sides of the MR element 230. And the MR sensor 210 further includes a non-magnetic insulating layer 215 formed at a side of the MR element 230 far from the ABS 15 of the slider 60. The non-magnetic insulating layer 215 electrically insulates the first shielding layer 211 from the second shielding layer 212. Preferably, in the present embodiment, the non-magnetic insulating layer 215 has a same width with that of the MR element 230. Selectively, a bigger width can be configured to the non-magnetic insulating layer 215 for being buried in the first shielding layer 211 or the second shielding layer 212.

The write head 220 includes a first write pole 221, a second write pole 222, coils 223 and a first gap layer 224 sandwiched between the first and second write pole 221, 222. All of the surfaces of the elements, namely the surfaces facing the ABS 15, are covered by an overcoat 205 so as to prevent or decrease the slider erosion. A second gap layer 225 is formed between the second shielding layer 212 of the MR sensor 210 and the first write pole 221. During writing, signal current is conducted through the coils 223 and flux is induced into the first and second write pole 221, 222, which causes flux to fringe across the pole tips at the ABS 15. This flux magnetizes circular tracks on the rotating disk 10 during a write operation.

Figure 4:
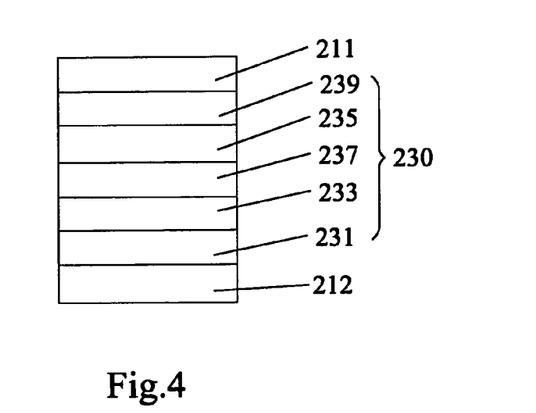
FIG. 4 is a cross-section view of the MR sensor that shows the stack structure thereof.

In the present embodiment, as shown in FIG. 4, the MR element 230 is a stack structure that includes an antiferromagnetic layer 231 formed on the second shielding layer 212, a pinned layer 233 formed on the antiferromagnetic layer 231, a free layer 235 formed on the pinned layer 233, an insulating tunnel barrier layer 237 formed between the pinned layer 233 and the free layer 235, and a cap layer 239 formed between the free layer 235 and the first shielding layer 211. Therein, the pinned layer 233 is pinned such that the direction of magnetization is kept constant regardless of an external magnetic field. The magnetization direction 21 of the pinned layer 233 is oriented generally perpendicular to the ABS 15. While the free layer 235 contains a ferromagnetic substance and has a magnetization direction 22 that changes or shift for its shape anisotropy effect in responds to an external magnetic field.

Figure 6:
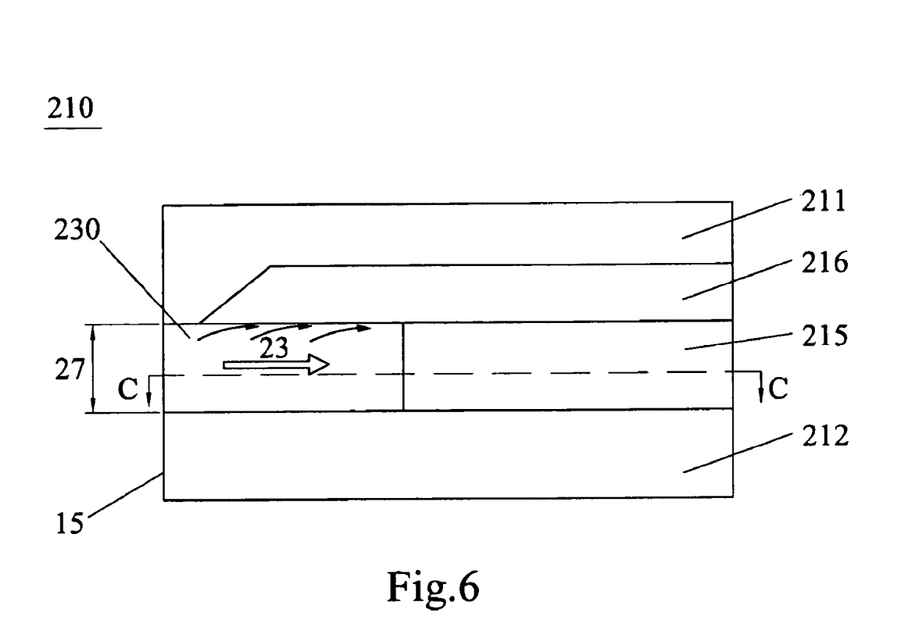
FIG. 6 is a partial detailed view of the MR sensor shown in FIG. 3.
Figure 7A:
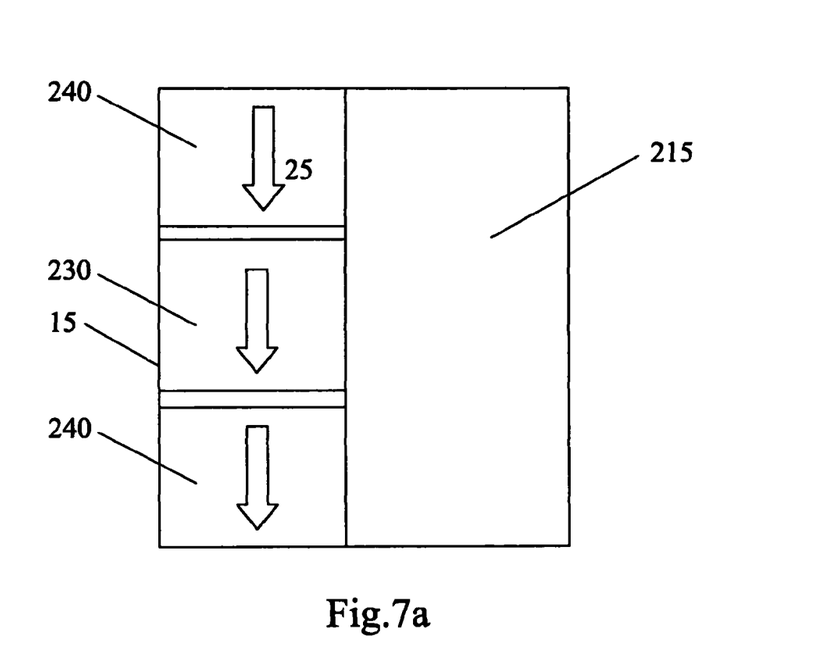
FIG. 7a is top view of the MR sensor along line C-C indicated in FIG. 6 that shows the longitudinal bias field leaking status.
Figure 7B:
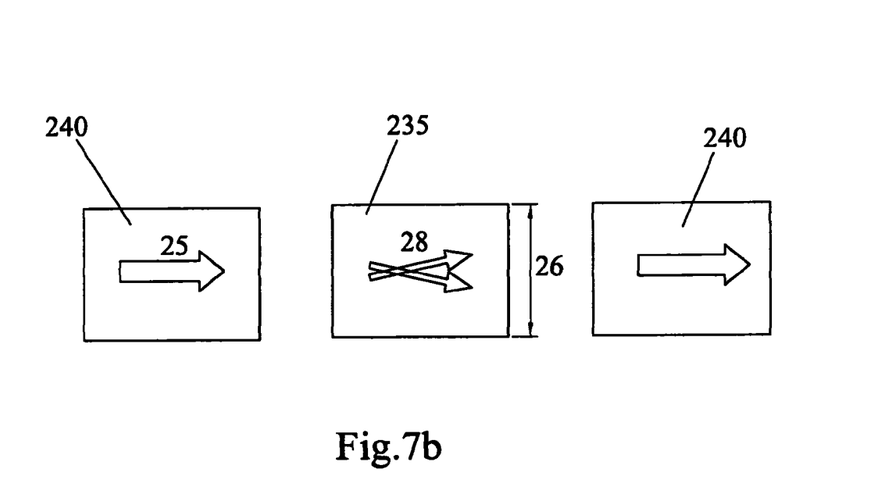
FIG. 7b shows the stable magnetization direction of the free layer with a higher MRH.
Figure 8:
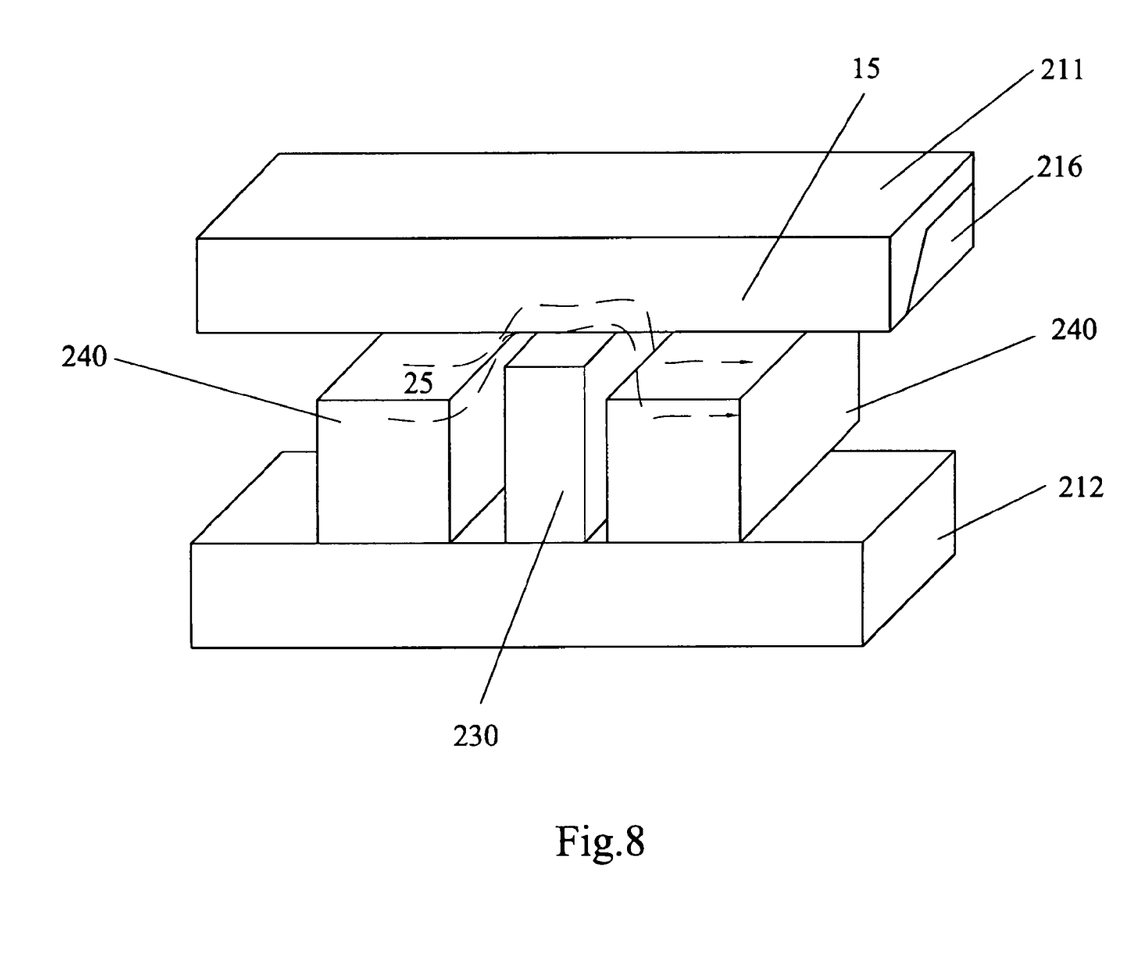
FIG. 8 is a simplified and partial perspective view of the MR sensor indicated in FIG. 3 that shows the signal field shunting status.

As illustrated in FIGS. 3 and 5-8, the MR sensor 210 further includes a first non-magnetic conducting layer 216 formed between the first shielding layer 211 and the MR element 230. Concretely, the first non-magnetic conducting layer 216 is trapezoidal which is dependent on the control process. In the present embodiment, the trapezoidal shape can be acquired by the general ion milling process. Other shapes, the rectangle for example, also can be designed by using a different process. Moreover, the first non-magnetic conducting layer 216 is embedded in the first shielding layer 211 and extended along thereof to make a distant separated the MR element 230 from the first shielding layer 211. For maintaining a sufficient narrow read gap 27, the first non-magnetic conducting layer 216 is kept separate from the ABS 15. It's indicated that, there is a distance between the first non-magnetic conducting layer 216 and the ABS 15 as shown in FIGS. 6 and 8, for example. In other words, the width of the read gap 27 illustrated in FIG. 6 is equal to that of the MR element 230. Thereby, the read gap 27 would not be broadened even though the first non-magnetic conducting layer 216 is added. Therefore, comparing with the prior art of the MR sensor, the read gap 27 in the present invention becomes narrower, so that it can recognize and detect the narrower linear density of magnetic bit, that is, the resolution power of the MR sensor is increased and, in turn, the SNR become better and the performance of reading data from disk is improved.

Now, a signal field shunting and a longitudinal bias field leaking status will be described. Referring to FIG. 6, when a disk drive unit with the slider 60 is in operation, an external signal field coming from a disk of a disk drive unit is supplied to the MR element 230, which has a magnetic direction 23 perpendicular to the ABS 15. Since the first non-magnetic conducting layer 216 is formed above the MR element 230 and separated from the first shielding layer 211 which is magnetic, that is, the distance between the MR element 230 and the first shielding layer 211 is adjusted to become long, thus a significant part of signal field will be prevented from shunting to the first shielding layer 211, as indicated by the arrows 23 shown in FIG. 6. Therefore, the more and stronger signal field will be utilized by the MR element 230, which is beneficial to increase the efficiency of the MR sensor 210.

On the other hand, please refer to FIGS. 7a and 8, a longitudinal bias field for stabilizing the free layer 235 of the MR element 230 is provided by the hard magnet layers 240, which has a magnetic direction 25 parallel to the ABS 15. As the first non-magnetic conducting layer 216 is formed between the first shielding layer 211 and the MR element 230 to separate them from a distance, thus a significant part of longitudinal bias field is prevented from leaking to the first shielding layer 211, that is, the less longitudinal bias field is weakened. As a result, comparing with the conventional design, the more and stronger longitudinal field utilized by the MR sensor 210 can be obtained, which can decrease the strength of the shape anisotropy effect of the free layer 235. Thus the magnetization direction of the free layer 235 of the MR sensor 210 won't fluctuate freely, which is beneficial for the stable performance of the MR sensor 210.

While in this condition, the magnetization direction of the free layer 235 would be maintained to be stable even if the MRH 26 is increase, which can be indicated in FIG. 7b. The arrow 28 having a preferred direction means the free layer 235 is more stable under the MRH 26 is relative higher. Based on the stable free layer 235, comparing with the conventional MR sensor, a MRH can be increased to a suitable and desired value and, in turn, increase the total sensor area which is helpful to improve the performance of the slider 60. For example, due to the larger sensor area, the higher resistance area is obtained, and thus a current density crossing the higher resistance area becomes lower, then an ESD and lifetime threshold performance of the MR sensor 210 is thus improved. In addition, a bigger resistance area can provide a higher MR ratio and a higher state ratio, and thus improving the reliability of the MR sensor 210.

Figure 9:
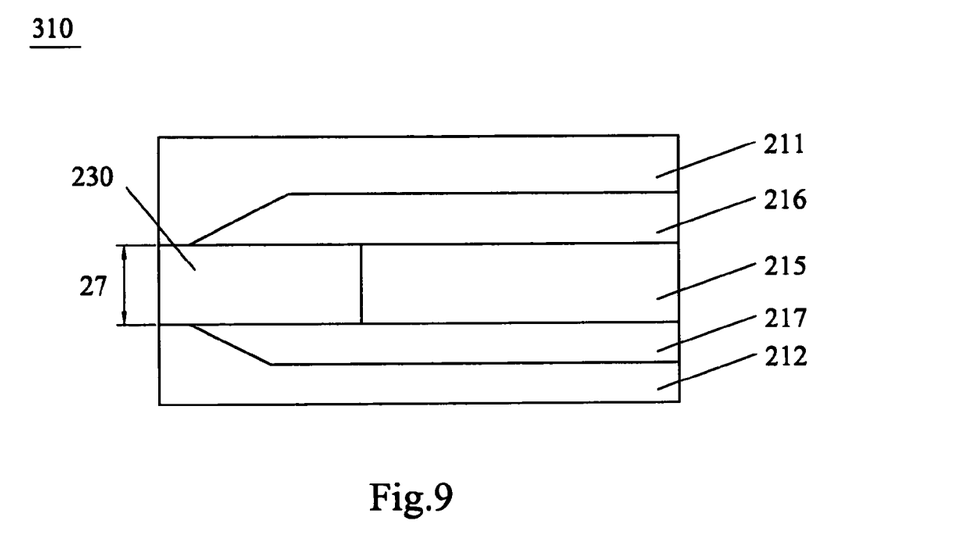
FIG. 9 is a schematic view of the MR sensor according to a second embodiment of the present invention.

FIG. 9 shows a detailed structure of the MR sensor 310 according to a second embodiment of the present invention. The main structure of the MR sensor 310 of the second embodiment is similar to that of the first embodiment described above, except that a second non-magnetic conducting layer 217 is added between the second shielding layer 212 and the MR element 230. As shown in FIG. 9, the second non-magnetic conducting layer 217 is trapezoidal, and is embedded in the second shielding layer 212 and extended along thereof to make a distant separated the MR element 230 from the second shielding layer 212. For maintaining a sufficient narrow read gap 27, the second non-magnetic conducting layer 217 is kept separate from the ABS 15 as well. Comparing with the prior art of the MR sensor, the read gap 27 in the present invention becomes narrower, so that it can recognize and detect the narrower linear density of magnetic bit, that is, the resolution power of the MR sensor 210 is increased and, in turn, the SNR become better and the performance of reading data from disk is improved.

Moreover, as described in the first embodiment, the function of the second non-magnetic conducting layer 217 is similar to that of the first non-magnetic conducting layer 216. For the design of the two non-magnetic conducting layers 216, 217 respectively attached on the first and the second shielding layers 211, 212, it can prevent the signal field shunting to the two shielding layers 211, 212 to improve the efficiency of the MR sensor, and the less longitudinal bias field could be leaked to the two shielding layers 211, 212 to acquire a more an stronger longitudinal field utilized by the MR sensor, which can decrease the strength of the shape anisotropy effect of the free layer 235. Thus the magnetization direction of the free layer 235 of the MR sensor 310 won't fluctuate freely to obtain a stable performance. Under this case, a MRH can be increased to a suitable and desired value and, in turn, increase the total sensor area which is helpful to improve the performance of the slider 60.

Figure 10:
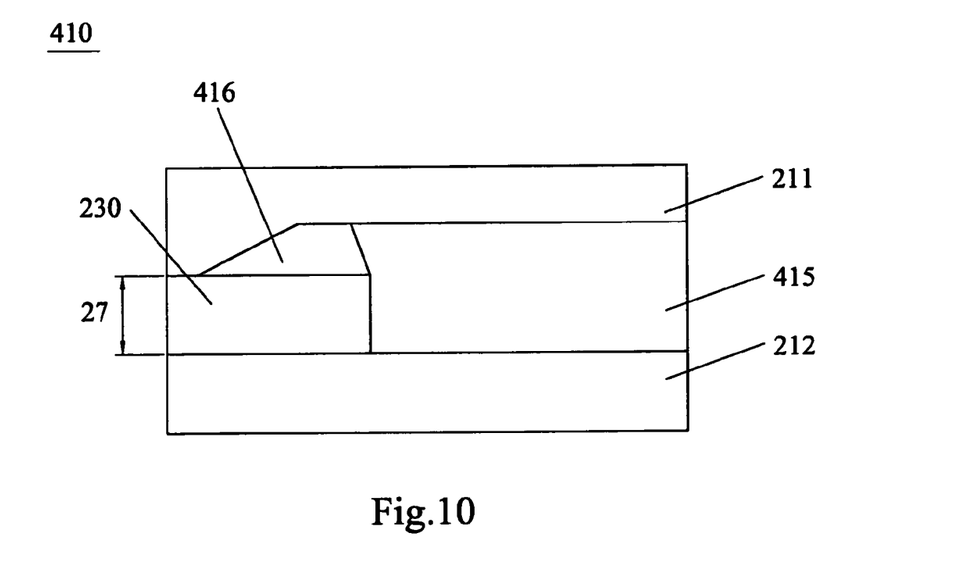
FIG. 10 is a schematic view of the MR sensor according to a third embodiment of the present invention.

FIG. 10 shows a detailed structure of the MR sensor 410 according to a third embodiment of the present invention. Similarly to the first embodiment, a first non-magnetic conducting layer 416 in the present embodiment is formed between the first shielding layer 211 and the MR element 230. More specifically, the first non-magnetic conducting layer 416 is trapezoidal, and is embedded in the first shielding layer 211 and extended along the MR element 230. A non-magnetic insulting layer 415 is formed between the first and the second shielding layers 211, 212, and abutted on a side of the MR element 230 far from the ABS 15 of the slider 60. Concretely, in the present embodiment, a bigger width is configured to the non-magnetic insulting layer 415 for being buried in the first shielding layer 211. For maintaining a sufficient narrow read gap 27, the first non-magnetic conducting layer 416 kept separate from the ABS 15 for a certain distance. Comparing with the prior art of the MR sensor, the read gap 27 in the present invention becomes narrower, so that it can recognize and detect the narrower linear density of magnetic bit, that is, the resolution power of the MR sensor 410 is increased and, in turn, the SNR become better and the performance of reading data from disk is improved. Furthermore, it also can prevent the signal field and the longitudinal bias field from shunting or leaking as described in the first embodiment.

Figure 11:
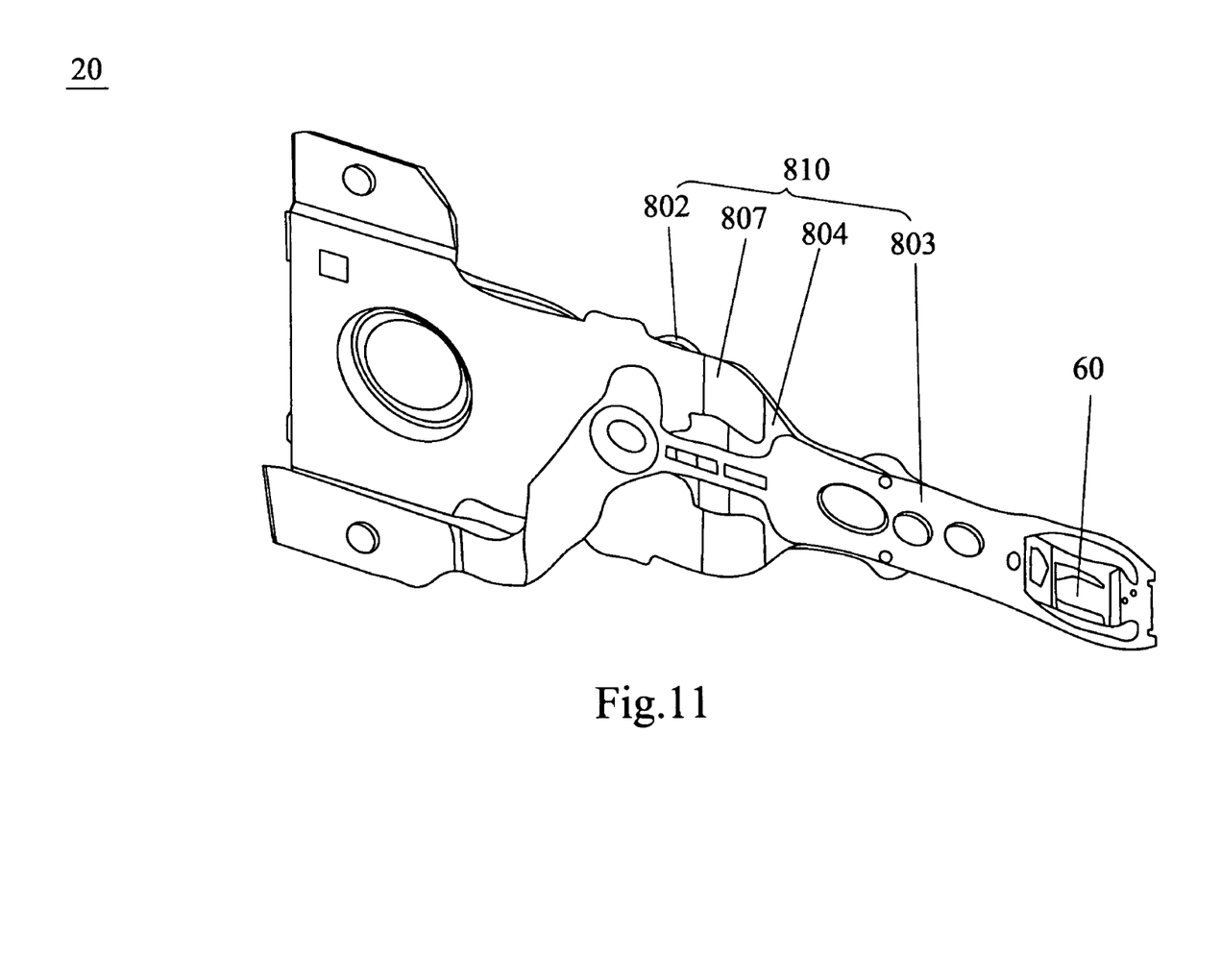
FIG. 11 is a perspective view of a HGA according to an embodiment of the present invention.

FIG. 11 shows a HGA 20 including the slider 60 with the MR sensor 210 described above according to an embodiment of the present invention. As shown, the HGA 20 generally includes the slider 60 described above and a suspension 810 to support the slider 60. The suspension 810 includes a base plate 802, a hinge 807, a flexure 803 and a load beam 804, all of which are assembled each other. The hinge 807 assembles the hinge 807 to the base plate 802. And the slider 60 is carried on the flexure 803. Because the structure and/or assembly process of suspension of the HGA are well known to persons ordinarily skilled in the art, a detailed description of such structure and assembly is omitted herefrom.

Figure 12:
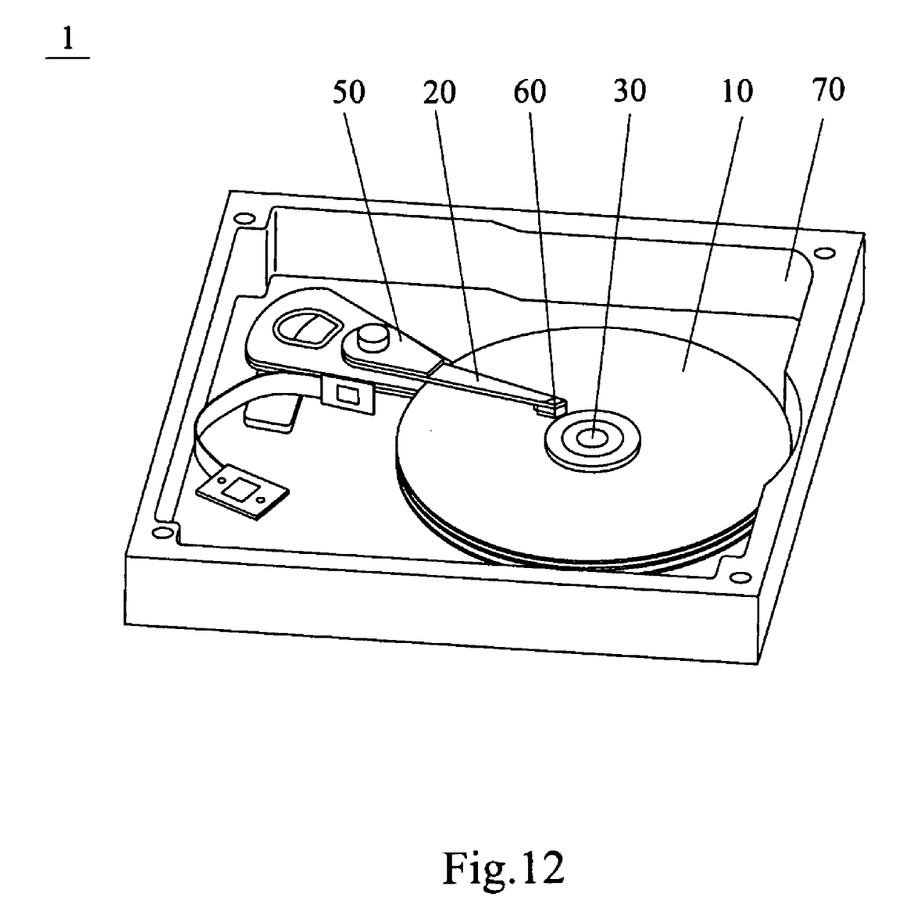
FIG. 12 is a perspective view of a disk drive unit according to an embodiment of the invention.

FIG. 12 illustrates a disk drive unit 1 including the slider 60 and the HGA 20 according to an embodiment of the present invention. The disk drive unit 1 includes a spindle motor 30, a series of the rotatable disks 10 mounted on the spindle motor 30, the HGA 20, a drive arm 50 connected with the HGA 20, the slider 60 of the HGA 20 set at a far end of the drive arm 50 and including a MR sensor 210, all of which are mounted in a housing 70. As well known to a person ordinarily skilled in the art, while the disk drive unit 1 operates, the disk 10 is rotated by the spindle motor 30, and the slider 60 will fly above the disk 10 due to the air pressure drawn by the rotated disk 10 so that the MR sensor 210 in the slider 60 may access the data tracks on disk 10.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A magnetoresistive sensor, comprising:
a first shielding layer;
a second shielding layer;
a magnetoresistive element and a pair of hard magnet layers sandwiched between said shielding layers, and the pair of hard magnet layers respectively placed on two sides of the magnetoresistive element; and
a non-magnetic insulating layer formed at a side of the magnetoresistive element far from an air bearing surface of a slider;
wherein the magnetoresistive sensor further comprises a first non-magnetic conducting layer formed between the first shielding layer and the magnetoresistive element, and the first non-magnetic conducting layer is embedded in the first shielding layer and kept separate from the air bearing surface, and the first non-magnetic conducting layer is in direct physical contact with the first shielding layer.

2. The magnetoresistive sensor as claimed in claim 1, wherein the magnetoresistive sensor further comprises a second non-magnetic conducting layer formed between the second shielding layer and the magnetoresistive element.

3. The magnetoresistive sensor as claimed in claim 2, wherein the second non-magnetic conducting layer is buried in the second shielding layer and kept separate from the air bearing surface.

4. The magnetoresistive sensor as claimed in claim 3, wherein at least the first or the second non-magnetic conducting layer is trapezoidal.

5. The magnetoresistive sensor as claimed in claim 1, wherein the non-magnetic insulating layer has a same width with that of the magnetoresistive element at least.

6. The magnetoresistive sensor as claimed in claim 1, wherein the magnetoresistive element comprises an antiferromagnetic layer formed on the second shielding layer, a pinned layer formed on the antiferromagnetic layer, a free layer formed on the pinned layer, and an insulating tunnel barrier layer formed between the pinned layer and the free layer.

7. A magnetic head, comprising:
a magnetoresistive sensor; and
a write head formed on the magnetoresistive sesor;
the magnetoresistive sensor comprising:
a first shielding layer;
a second shielding layer;
a magnetoresistive element and a pair of hard magnet layers sandwiched between said shielding layers, and the pair of hard magnet layers respectively placed on two sides of the magnetoresistive element; and
a non-magnetic insulating layer formed at a side of the magnetoresistive element far from an air bearing surface of a slider;
wherein the magnetoresistive sensor further comprises a first non-magnetic conducting layer formed between the first shielding layer and the magnetoresistive element, and the first non-magnetic conducting layer is embedded in the first shielding layer and kept separate from the air bearing surface, and the first non-magnetic conducting layer is in direct physical contact with the first shielding layer.

8. The magnetic head as claimed in claim 7, wherein the magnetoresistive sensor further comprises a second non-magnetic conducting layer formed between the second shielding layer and the magnetoresistive element.

9. The magnetic head as claimed in claim 8, wherein the second non-magnetic conducting layer is buried in the second shielding layer and kept separate from the air bearing surface.

10. The magnetic head as claimed in claim 9, wherein at least the first or the second non-magnetic conducting layer is trapezoidal.

11. The magnetic head as claimed in claim 7, wherein the non-magnetic insulating layer has a same width with that of the magnetoresistive element at least.

12. The magnetic head as claimed in claim 7, wherein the magnetoresistive element comprises an antiferromagnetic layer formed on the second shielding layer, a pinned layer formed on the antiferromagnetic layer, a free layer formed on the pinned layer, and an insulating tunnel barrier layer formed between the pinned layer and the free layer.

13. A head gimbal assembly, comprising:
a slider with a magnetoresistive sensor; and
a suspension to support the slider;
the magnetoresistive sensor comprising:
a first shielding layer;
a second shielding layer;
a magnetoresistive element and a pair of hard magnet layers sandwiched between said shielding layers, and the pair of hard magnet layers respectively placed on two sides of the magnetoresistive element; and
a non-magnetic insulating layer formed a side of the magnetoresistive element far from an air bearing surface of a slider;
wherein the magnetoresistive sensor further comprises a first non-magnetic conducting layer formed between the first shielding layer and the magnetoresistive element, and the first non-magnetic conducting layer is embedded in the first shielding layer and kept separate from the air bearing surface, and the first non-magnetic conducting layer is in direct physical contact with the first shielding layer.

14. The head gimbal assembly as claimed in claim 13, wherein the magnetoresistive sensor further comprises a second non-magnetic conducting layer formed between the second shielding layer and the magnetoresistive element.

15. The head gimbal assembly as claimed in claim 14, wherein the second non-magnetic conducting layer is buried in the second shielding layer and kept separate from the air bearing surface.

16. The head gimbal assembly as claimed in claim 15, wherein at least the first or the second non-magnetic conducting layer is trapezoidal.

17. The head gimbal assembly as claimed in claim 13, wherein the non-magnetic insulating layer has a same width with that of the magnetoresistive element at least.

18. The head gimbal assembly as claimed in claim 13, wherein the magnetoresistive element comprises an antiferromagnetic layer formed on the second shielding layer, a pinned layer formed on the antiferromagnetic layer, a free layer formed on the pinned layer, and an insulating tunnel barrier layer formed between the pinned layer and the free layer.

19. A disk drive unit, comprising:
   a head gimbal assembly with a slider;
   a drive arm to connect with the head gimbal assembly;
   a rotatable disk; and
   a spindle motor to spin the disk;
   the slider has a magnetoresistive sensor comprising:
      a first shielding layer;
      a second shielding layer;
      a magnetoresistive element and a pair of hard magnet layers sandwiched between said shielding layers, and the pair of hard magnet layers respectively placed on two sides of the magnetoresistive element; and
      a non-magnetic insulating layer formed at a side of the magnetoresistive element far from an air bearing surface of a slider;
   wherein the magnetoresistive sensor further comprises a first non-magnetic conducting layer formed between the first shielding layer and the magnetoresistive element, and the first non-magnetic conducting layer is embedded in the first shielding layer and kept separate from the air bearing surface, and the first a non-magnetic conducting layer is in direct physical contact with the first shielding layer.

* * * * *